United States Patent [19]

Rojey et al.

[11] Patent Number: 4,532,773
[45] Date of Patent: Aug. 6, 1985

[54] PROCESS FOR PRODUCING COLD AND/OR HEAT BY MEANS OF AN ABSORPTION CYCLE COMPRISING AT LEAST TWO ABSORPTION STEPS

[75] Inventors: Alexandre Rojey, Garches; Régis Bonifay, Asnieres; Jean-Paul Cariou, Orgeval, all of France

[73] Assignee: Institut Francais du Petrole, Rueil-Malmaison, France

[21] Appl. No.: 569,697

[22] Filed: Jan. 10, 1984

[30] Foreign Application Priority Data

Jan. 10, 1983 [FR] France ............................... 83 00370

[51] Int. Cl.³ ............................................. F25B 15/00
[52] U.S. Cl. ......................................... 62/101; 62/114
[58] Field of Search ...................... 62/101, 114, 238.3, 62/324.2

[56] References Cited

U.S. PATENT DOCUMENTS 2,212,869  8/1940  Tornquist ............................... 62/101
4,341,084  7/1982  Rojey et al. ........................... 62/101
4,348,868  9/1982  Foster et al. .......................... 62/101

Primary Examiner—Lloyd L. King
Attorney, Agent, or Firm—Millen & White

[57] ABSTRACT

A process is provided for producing cold and/or heat by means of a thermal unit operating by absorption. Increased performances are obtained by using a condensable auxiliary fluid and performing the absorption in two successive steps (absorbers $A_{20}$ and $A_{21}$). The unit for conducting the process essentially comprises a generator ($S_{20}$), a condenser ($E_{20}$), an evaporator ($E_{21}$) and two absorbers ($A_{20}$ and $A_{21}$).

8 Claims, 7 Drawing Figures

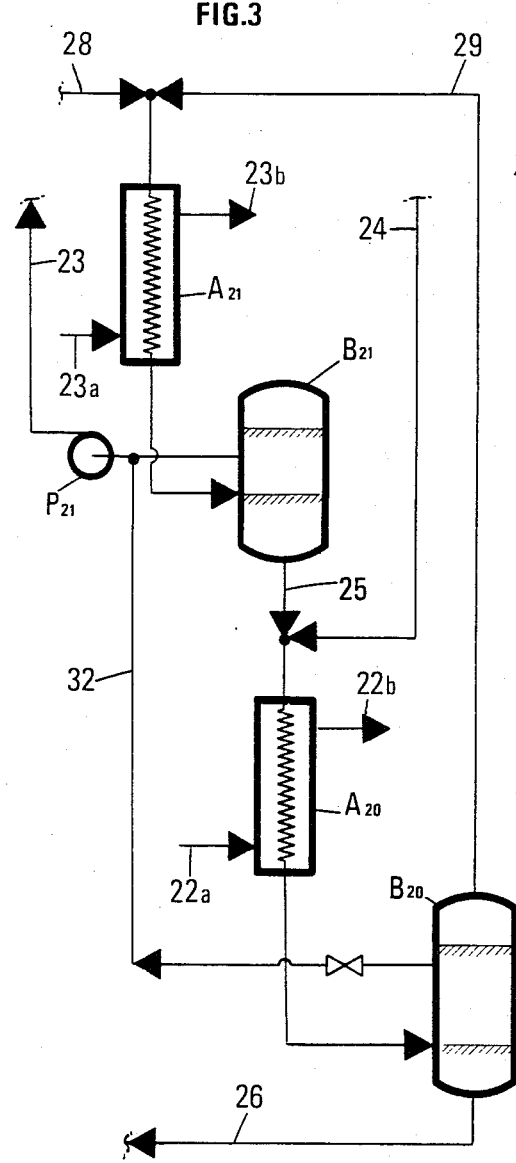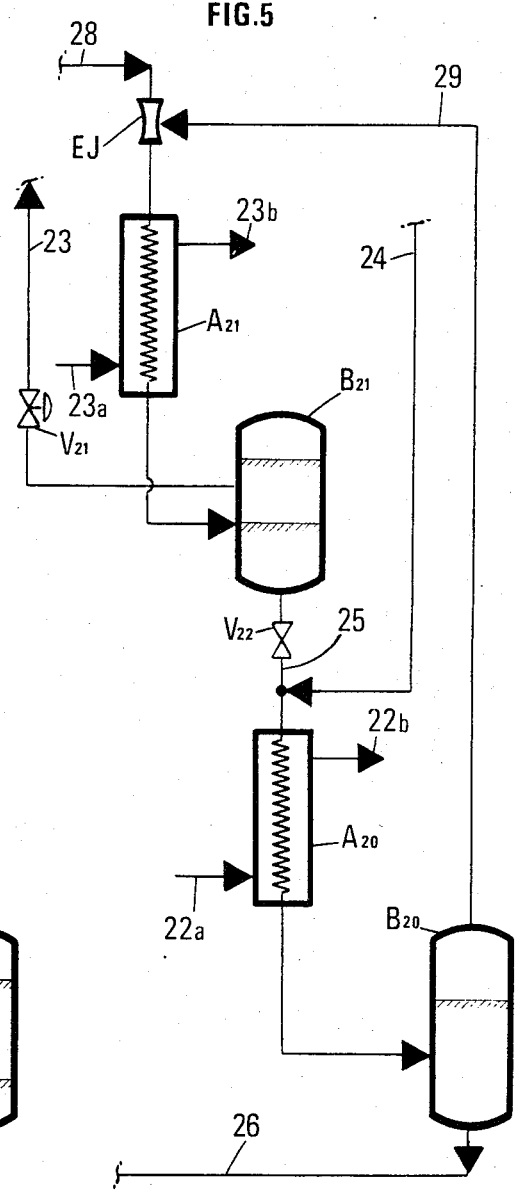

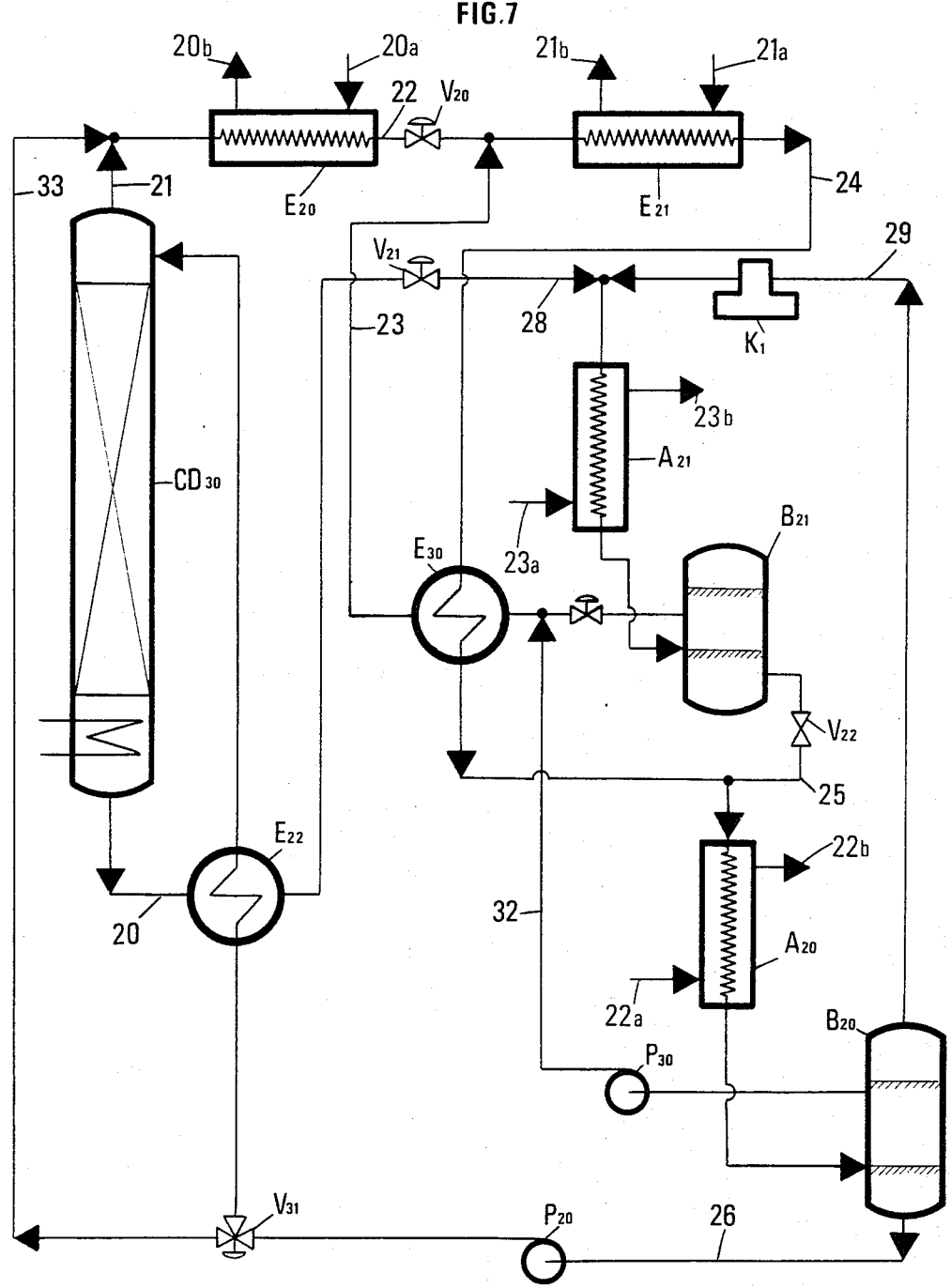

PROCESS FOR PRODUCING COLD AND/OR HEAT BY MEANS OF AN ABSORPTION CYCLE COMPRISING AT LEAST TWO ABSORPTION STEPS

BACKGROUND OF THE INVENTION

The known processes for producing cold and/or heat by means of an absorption cycle use a working fluid (F) and a solvent (S). The working fluid (F) is successively condensed while releasing heat, expanded, vaporized by taking heat from an external fluid, absorbed and then desorbed at a higher pressure.

U.S. Pat. No. 4,413,479 discloses an improvement to this cycle comprising the use of an auxiliary fluid (H) which vaporizes in admixture with fluid (F) and condenses while fluid (F) absorbs in solvent (S). Fluid (H), which is at least partially immiscible with the solution of fluid (F) in solvent (S), is separated from the rich solution of (F) in (S) obtained in the absorption step and recycled to the evaporation step.

Such a process is illustrated by the flowsheet of FIG. 1. Fluid (F) is discharged in vapor phase from the rectification zone $R_{10}$ through line 11, then condensed in condensor $E_{10}$, which is itself cooled by the external cooling stream 1–2. A fraction of the resultant liquid phase is fed through line 15 to the rectification zone and the remaining fraction is expanded through the expansion valve $V_{10}$ and admixed with the liquid phase formed by fluid (H) supplied through line 13. The mixture of fluids (F) and (H) is vaporized in exchanger $E_{11}$ by taking heat from an external fluid (lines 3–4) and the resultant vapor phase is fed through line 14 to the absorption zone $A_{10}$ and admixed with the lean solution supplied through line 12, after expansion through the expansion valve $V_{11}$.

During the absorption of fluid (F) and the condensation of fluid (H) in the absorption zone $A_{10}$, the absorption heat as well as the condensation heat are transferred to an external fluid (circuit 7,8). At the output of the absorption zone, the two liquid phases formed on the one hand of a solution of fluid (F) in solvent (S) and, on the other hand, of fluid (H), are separated in the settling drum BD1. The solution of fluid (F) in solvent (S) obtained at the output of the settling drum BD1 is conveyed to the desorption column which comprises the rectification zone $R_{10}$ and the stripping zone $S_{10}$, through pump $P_{10}$, line 9 and exchanger $E_{12}$ wherein it is heated by heat exchange with the lean solution from the desorption column (line 10). In the bottom portion of the desorption column, the solution from the absorption step is heated and produces a vapor phase which is fed to the rectification zone $R_{10}$ wherein the vapor phase is separated from the major part of solvent (S), driven along with the vapor phase, this rectification being unnecessary when no noticeable carrying of solvent occurs. The liquid phase of fluid (H) is withdrawn by pump $P_{15}$ and recycled to the input of evaporator $E_{11}$ through line 13.

The selection of fluid (H) is very important and determines the gain factor, defined as the ratio $(F_1+F_2)/F_1$ wherein $F_1$ is the vaporization heat of fluid (F) and $F_2$ the vaporization heat of fluid (H) involved in evaporator $E_{11}$.

This gain factor increases with the proportion of fluid (H) vaporized in evaporator $E_{11}$ and it has been shown in the above-mentioned patent that the use of a relatively volatile fluid (H) is advantageous, the volatility of fluid (H) being limited by the necessity of condensing fluid (H) during the absorption of (F) in (S).

SUMMARY OF THE INVENTION

It has been discovered, and this is the object of the present invention, that the performances of an absorption cycle using a working fluid (F), a solvent (S) and an auxiliary fluid (H) which at least partly vaporizes during the absorption of fluid (F) into solvent (S), may be improved by performing the absorption of (F) in (S) in at least two steps.

BRIEF DESCRIPTION OF THE DRAWINGS

FIG. 3 is another specific schematic diagram illustrating a system for conducting a process according to the invention;

FIG. 5 is a modification of the system of FIG. 2 wherein the vapor phase issuing from the first separating drum is contacted with a solution supplied through an ejector;

FIG. 7 is still a further variation of the invention wherein fluid (H) comprises a mixture.

DETAILED DISCUSSION OF THE INVENTION

Figure 1:
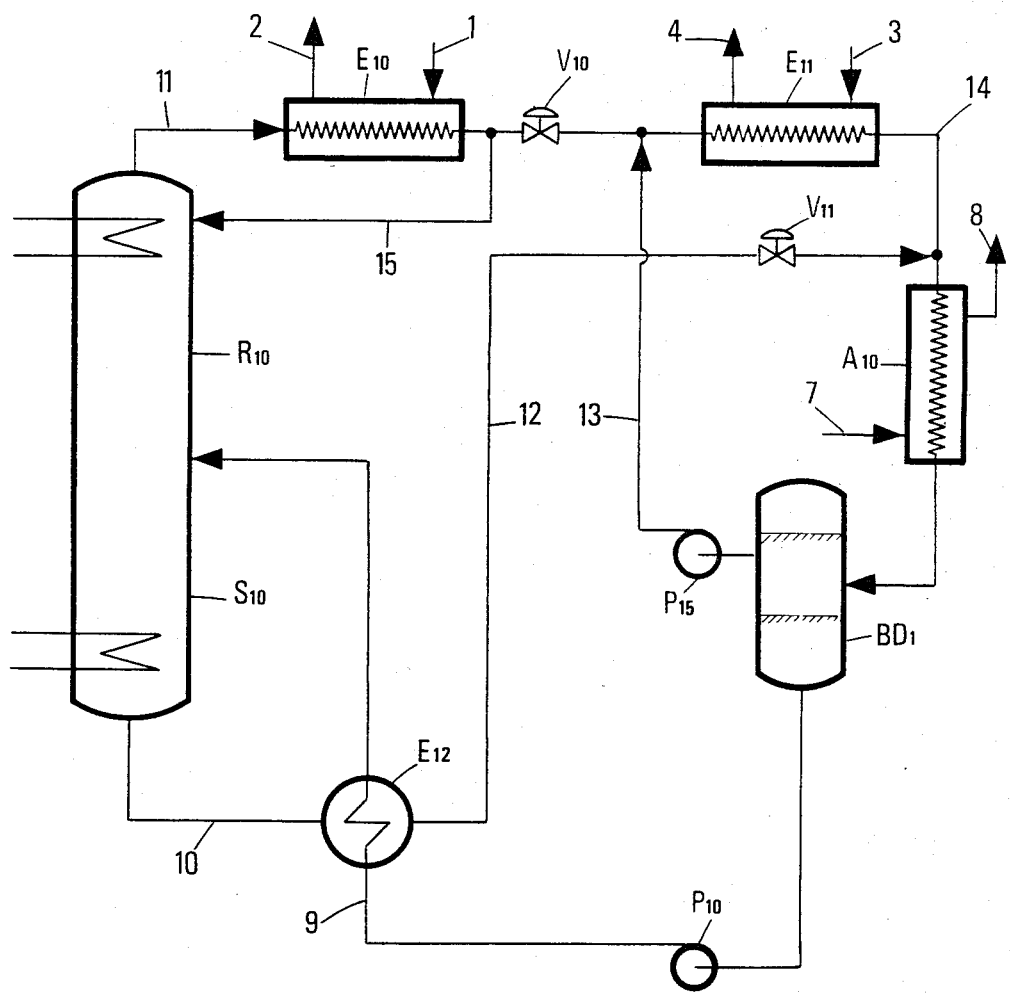
FIG. 1 illustrates a prior art schematic diagram of a system for conducting a prior art process for producing cold and/or heat by means of an absorption cycle using a working fluid, a solvent and an auxiliary fluid which vaporizes in mixture with the working fluid.
Figure 2:
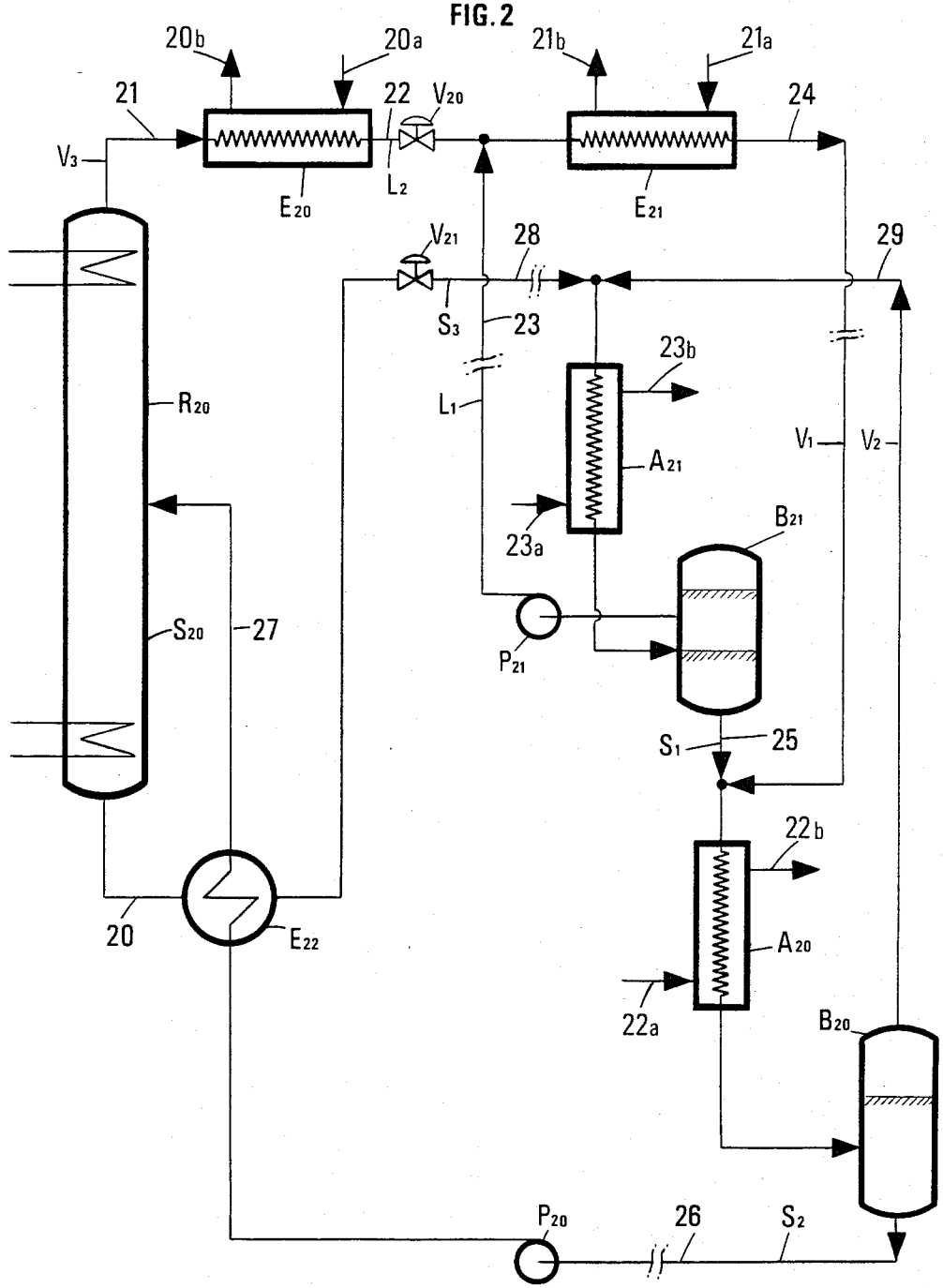
FIG. 2 is a schematic diagram, similar to FIG. 1, but modified for conducting the improved process of the invention.

These two absorption steps may be processed as illustrated in FIG. 2.

The working fluid (F) issues in vapor phase from the rectification zone $R_{20}$ through line 21. It is condensed in exchanger $E_{20}$ (cooled by a fluid circulating through lines 20a and 20b) wherefrom it is discharged through line 22. It is then expanded through the expansion valve $V_{20}$ and admixed with the auxiliary fluid (H) supplied in liquid phase through line 23. The mixture of (F) and (H) is vaporized in exchanger $E_{21}$, (by taking heat at low heat level from fluid 21a–21b), wherefrom it is discharged in vapor phase through line 24. This vapor phase is contacted with the solution of (F) in (S) supplied through line 25. Fluid (F) issuing from evaporator $E_{21}$ is partially absorbed in absorber $A_{20}$, cooled by a fluid flowing through lines 22a–22b: the liquid-vapor mixture discharged from absorber $A_{20}$ is separated in drum $B_{20}$. The resultant liquid phase formed of a solution of (F) in (S) is discharged through line 26 and taken up again by pump $P_{20}$ which supplies it through exchanger $E_{22}$ and line 27 to the desorption column including the rectification zone $R_{20}$ and the finishing zone $S_{20}$. The solution is heated at the bottom of the column, thus generating a vapor phase of high (F) content and a solution of low (F) content in (S) which is discharged through line 20 and passes through exchanger $E_{22}$ wherefrom it is discharged through line 28, comprising an expansion valve $V_{21}$.

The vapor phase issued from absorber $A_{20}$, comprising fluid (H) and unabsorbed fluid (F), is separated in drum $B_{20}$ wherefrom it is discharged through line 29. It is admixed at the output of line 29 with the lean solution supplied through line 28 and the resultant liquid-vapor mixture is fed to a second absorber $A_{21}$ cooled by a fluid flowing through lines $23a$–$23b$. In this absorber, fluid (H) is condensed and fluid (F) is absorbed. Thus two liquid phases are obtained which are separated in drum $B_{21}$. The solution of (F) in (S) is conveyed through line 25 to the input of the first absorber $A_{20}$ and the liquid phase formed of fluid (H) is conveyed through pump $P_{21}$ and line 23 to the input of evaporator $E_{21}$.

In short, the process is characterized by:

(a) A first absorption step of contacting a vapor phase $(V_1)$ comprising a working fluid (F) and an auxiliary fluid (H) with a solution $(S_1)$ of fluid (F) in a solvent (S) issued from step (c) under such operating conditions as to provide for an absorption of fluid (F) and a null or partial condensation of fluid (H), transferring heat to an external fluid, so as to obtain a solution $(S_2)$ of (F) in (S) of increased fluid (F) content and a vapor phase $(V_2)$ comprising unabsorbed fluid (F) and uncondensed fluid (H) and separating said solution $(S_2)$ from said vapor phase $(V_2)$, fluid (H) being at least partly immiscible in solvent (S) and in solutions of fluid (F) in solvent (S).

(b) Contacting, in a second absorption step, the vapor phase $(V_2)$ issued from step (a) with a relatively lean solution $(S_3)$ of fluid (F) in solvent (S) while absorbing fluid (F) and condensing fluid (H) from the vapor phase, transmitting the absorption heat and the condensation heat to an external fluid and recovering a mixture of a liquid phase $(L_1)$ of fluid (H) with a solution $(S_1)$ of fluid (F) in solvent (S).

(c) separating the solution $(S_1)$ of fluid (F) in solvent (S) from the liquid phase $(L_1)$ of fluid (H), issued from step (b) and feeding back said solution $(S_1)$ of fluid (F) in solvent (S) to step (a).

(d) feeding the solution $(S_2)$ of fluid (F) in solvent (S) issued from step (a) to a desorption step, subjecting said solution to desorption conditions, the desorption heat being taken from an external fluid, so as to obtain a vapor phase $(V_3)$ of high fluid (F) content and a solution $(S_3)$ of low fluid (F) content; separating the vapor phase $(V_3)$ from the solution $(S_3)$ and recycling said solution $(S_3)$ to the second absorption step (b).

(e) condensing at least a portion of the vapor phase $(V_3)$ of high fluid (F) content, issued from the desorption step (d), by transferring heat to an external fluid to form a condensation liquid phase $(L_2)$.

(f) admixing at least a portion of the condensation liquid phase $(L_2)$ obtained in step (e) with at least a portion of the liquid phase $(L_1)$ of fluid (H) issued from step (c) and vaporizing at least a portion of the resultant mixture by taking heat from an external fluid, the operating conditions being so selected as to vaporize at least a portion of fluid (F) and at least a portion of fluid (H), thus obtaining a vapor phase $(V_1)$, and (g) recycling the resultant vapor phase $(V_1)$ to step (a).

By this process, fluid (H) may be condensed in the presence of a relatively low partial pressure of fluid (F), the concentration of fluid (F) in solvent (S) being smaller at the end of step (b) than at the end of step (a). This results in the advantage of using a more volatile fluid (H) and hence of increasing the proportion of fluid (H) during the evaporation step (f). On the other hand, the concentration of fluid (F) in the solvent (S) as achieved at the end of step (a) in higher, thus allowing to decrease the feed back rate, to decrease the reflux rate when the vapor phase produced in the desorption step is rectified and also to improve the cycle performances.

Different fluids (F), (S) and (H) may be used. This fluid (F) may be ammonia, solvent (S) water and fluid (H) a hydrocarbon such as propane, butane or pentane.

In another case fluid (F) may be water, solvent (S) a solution of lithium bromide and the auxiliary fluid (H) a hydrocarbon such as heptane.

For a given couple of fluids (F) and (S), the selection of fluid (H) depends on the difference in the respective temperatures at the inlet of the evaporator and at the outlet of the absorber where is performed the second absorption step (b), fluid (H) being so selected that the difference between its vapor pressures respectively at these two temperatures, be close to, while remaining lower than, the vapor pressure of fluid (F) at the evaporator input.

When fluid (F) consists of ammonia, water being the solvent, or of water, the solvent (S) consisting of a lithium bromide solution, fluid (F) may be a hydrocarbon, for example a paraffinic hydrocarbon whose number of carbon atoms is generally from 3 to 8 or a halogenated hydrocarbon such as, for example, difluorochloromethane R 22, difluorodichloromethane R 12 or pentafluorochloromethane R 115. In some cases, it may consist of an alcohol such as methanol or ethanol or a ketone such as acetone, when the working fluid (F) is water and the solvent (S) is a solution of lithium bromide.

The process according to the invention is also applicable when fluid (F) is different from water or ammonia, for example, an organic fluid such as a hydrocarbon or a halogenated hydrocarbon.

Solvent (S) in this occurrence may be an organic solvent such as dimethylformamide, dimethylsulfoxide, N-methylpyrrolidone, tetraethylene glycol, benzyl alcohol or a hydrocarbon. It may be also a synthesis product used as lubricant, such, for example, as a lubricant of low viscosity comprising alkyl phenyls or polyolefins as basic materials.

Fluid (H) is then so selected as to be at least partially immiscible with the solution issued from the absorption step (b).

Fluid (H) may advantageously consist, in the process of the invention, of a mixture of constituents such as a mixture of hydrocarbons or a mixture of halogenated fluids.

As a matter of fact, the volatility of fluid (H) must be adapted to the operating conditions and, by adjusting the proportions of the mixture components, it is possible to exactly determine the volatility of the mixture.

A mixture having the maximum volatility compatible with a complete condensation of the mixture at the end of the second absorption step (b) is advantageously used.

The flow rate of fluid (H) is then preferably so selected that, at the end of the evaporation step (f), the vapor phase is saturated with (H).

When fluid (H) consists of a mixture of several substances which do not form an azeotrope or which are present in non-azeotropic proportions, a condensed liquid phase is generally obtained at the end of each of the two absorption steps (a) and (b), the two liquid phases being of different compositions.

When the temperature at the end of the absorption step (a) and the temperature at the end of the absorption step (b) are close to each other, the light constituent content of liquid phase (H) obtained at the end of the absorption step (b) is higher than the light constituent content of the liquid phase (H) obtained at the end of the absorption step (a).

Such an arrangement where a liquid phase (H) is recovered at the end of each of the absorption steps (a) and (b) is illustrated in FIG. 3 (modification of FIG. 2).

In this case, a first liquid phase (H) is recovered at the output of absorber $A_{20}$ wherein is performed the absorption step (a) and a second liquid phase (H) at the output of absorber $A_{21}$. These two phases are taken by pump $P_{21}$, the liquid phase (H) issued from the collecting and settling drum $B_{20}$ being supplied through line 32.

The flow of fluid (H) may be regulated, for example, by maintaining the level of the liquid phase (H) in the drum $B_{20}$ at the same value under given operating conditions. By modifying the instructions setting the value of this level, the respective volumes of the liquid phase (H) contained in drums $B_{20}$ and $B_{21}$, whose compositions are different, are modified, the total composition being unchanged. Thus, by decreasing the level in drum $B_{20}$, the proportion of heavy constituent is increased in drum $B_{21}$ and in the flowing mixture and, conversely, by increasing this level, the proportion of heavy constituent is decreased in drum $B_{21}$ and in the flowing mixture.

Thus, a simple means is provided for modifying the composition of the flowing mixture, in order to adapt it to the operating conditions.

Figure 4:
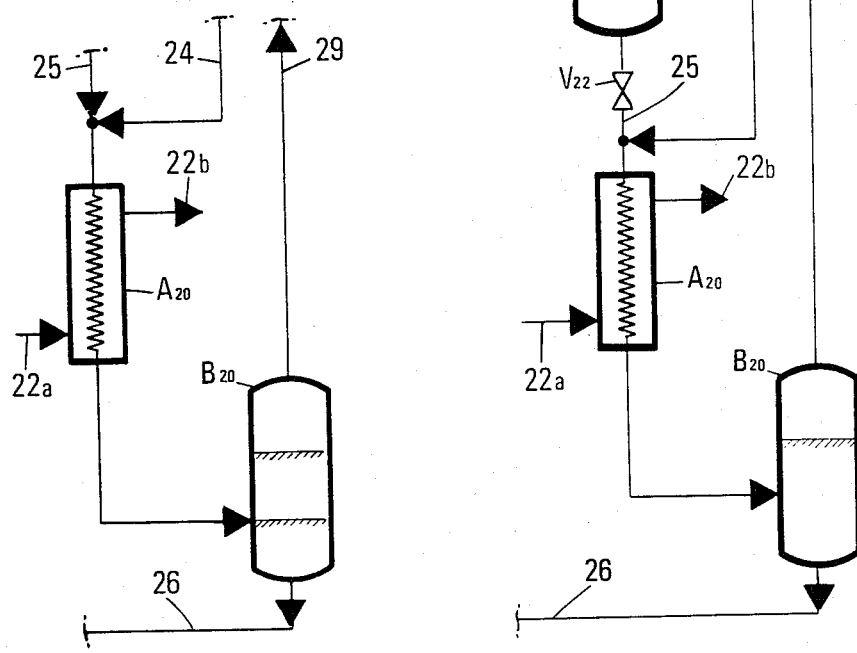
FIG. 4 is still another schematic diagram of the invention, in this case showing a modification of the system of FIG. 2.

Another embodiment consists of operating according to the diagram shown in FIG. 4. In this case, the liquid phase (H) recovered at the output of absorber $A_{20}$ is stored in drum $B_{20}$ without being taken by pump $P_{21}$. FIG. 4 is a modification of FIG. 2. In this case, the level of liquid phase (H) in drum $B_{20}$ increases until the heavy constituent content of mixture (H) circulating through pump $B_{21}$ and evaporator $E_{21}$ is sufficiently low for nullifying the flow of liquid phase (H) condensed at the output of absorber $A_{20}$, thus providing for automatic adjustment of the composition of the flowing mixture (H) in accordance with the operating conditions, in particular by increasing the content of light constituent when the difference in temperature, respectively at the output of the evaporation step and at the output of the absorption step, decreases.

The process according to the invention is illustrated by example 1.

EXAMPLE 1

This example refers to FIG. 3. A flow of 1770 kg/h of a 30% molar aqueous solution of ammonia is supplied through pump $P_{20}$ and through exchanger $E_{22}$ to the desorption column. The desorption column operates at a pressure of 18 bars. The column bottom is provided with a 252 KW thermal power. The ammonia vapor discharged at the top of the rectification zone $R_{20}$ is condensed in exchanger $E_{20}$ wherefrom it is delivered at the temperature of 45° C. while transferring a 163 KW thermal power to an external fluid. The resultant condensate is expanded through valve $V_{20}$ and admixed with a flow of 949 kg/h of a mixture of 94% butane and 6% pentane in molar proportion. The resultant mixture is supplied to evaporator $E_{21}$ wherein it vaporizes by receiving a 214 KW thermal power from an external fluid, and wherefrom it is discharged at a temperature of 15° C. The resultant ammonia vapor is partially absorbed in absorber $A_{20}$ whereas the vapor phase hydrocarbons are partially condensed. An aqueous ammonia solution, a second liquid phase containing 92% butane and 8% pentane in molar proportions and a vapor phase are obtained at the output of absorber $A_{20}$. The vapor phase is conveyed to absorber $A_{21}$ wherein it is contacted with the solution issuing from the desorption column through line 28. An aqueous solution containing 15% of ammonia is obtained at the output of absorber $A_{21}$ and supplied through line 25 to absorber $A_{20}$. A 231 KW thermal power is produced in absorber $A_{21}$ and transferred to an external liquid.

The second absorption step (b) is advantageously performed at a higher pressure than that used in the first absorption step (a). As a matter of fact, it is possible in this case to condense a lighter fluid (H) than when the absorption step (b) is conducted at a pressure close to that of the absorption step (a), hence to increase the proportion of fluid (H) during the evaporation step and the gain factor.

In the arrangement illustrated by the diagram of FIG. 5, the vapor phase issuing from drum $B_{20}$ is contacted with the solution supplied from line 28 through an ejector EJ, in order to obtain in absorber $A_{21}$ a pressure level higher than the pressure level prevailing in absorber $A_{20}$. The two liquid phases obtained at the output of absorber $B_{21}$ are then expanded through the expansion valves $V_{21}$ and $V_{22}$ before being recycled. FIG. 5 is a modification of FIG. 2.

Figure 6:
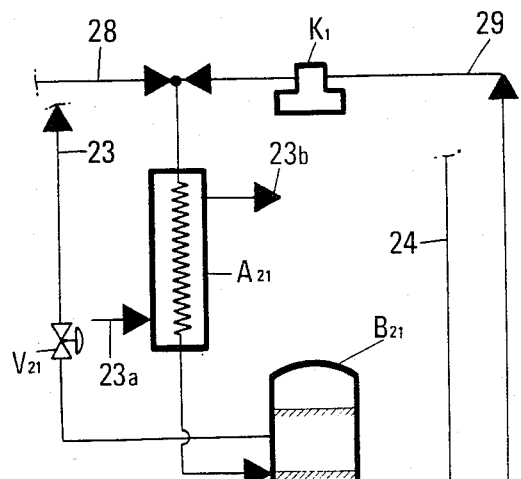
FIG. 6 is a modification of the system of FIG. 5 including a compressor $K_1$.

In the modification shown on the diagram of FIG. 6, the vapor phase issuing from drum $B_{20}$ is compressed in compressor $K_1$ before being contacted with the solution supplied through line 28, thereby providing the absorber $A_{21}$ a pressure level higher than the pressure level prevailing in absorber $A_{20}$.

In this case, fluid (H) consists advantageously of a mixture and an arrangement such as that shown, for example, in FIG. 7, can be used.

In this arrangement, a first liquid phase (H), obtained at the end of the first absorption step (a) performed in absorber $A_{20}$, is taken by pump $P_{30}$ and supplied to line 32 for being admixed with a second liquid phase (H) recovered at the end of the second absorption step (b) performed in absorber $A_{21}$.

An arrangement involving a step of compressing the vapor phase obtained at the end of the first absorption step (a) is particularly advantageous to obtain relatively high heating temperatures. In this case, the problem arises of limiting the higher pressure of the system.

In the arrangement shown in the diagram of FIG. 7, the higher pressure is limited by admixing the vapor phase issued from the desorption zone with a fraction of the rich solution issued from the absorption step (a).

The principle which operates for limiting the pressure is hence the following:

The rich solution of (F) in ( S) issuing from the absorption zone is divided into a first fraction which is fed to the desorption zone wherein are obtained, by heating the solution, a lean solution which is fed to the absorption zone and a vapor phase which is admixed with a second fraction of the rich solution issued from the absorption zone, the resultant mixture being cooled, so as to form a liquid phase consisting of a concentrated solution of (F) in (S), which is expanded and supplied to the evaporation zone.

In the arrangement illustrated by the diagram of FIG. 7, the rich solution is divided into two fractions in a three-way valve $V_{31}$, a first fraction which is supplied through exchanger $E_{22}$ to the desorption column $CD_{30}$ wherein it is contacted with the vapor phase obtained by heating the column bottom and a second fraction which is fed through line 33 to be admixed with the vapor phase issuing through line 21 from column CD$_{30}$.

Such an arrangement is illustrated in example 2.

EXAMPLE 2

This example makes reference to FIG. 7.

1965 kg/h of a 30% molar ammonia aqueous solution are supplied through pump P$_{20}$ to the desorption zone. The three-way valve V$_{31}$ divides this stream into two fractions and supplies 195 kg/h to line 33 and 1770 kg/h through exchanger E$_{22}$ to the top of column CD$_{30}$. The ammonia vapor obtained at the top of column CD$_{30}$ is admixed with the solution supplied through line 33 and the resultant mixture is cooled in exchanger E$_{20}$, while forming a solution of 78% molar ammonia content.

The thermal power supplied in exchanger E$_{20}$ is transferred to an external water stream for heating thereof from 57° to 65° C. The resultant solution is expanded through valve V$_{20}$ and admixed with the liquid hydrocarbon phase supplied through line 23, whose molar composition is as follows:

Normal butane: 0.70
Normal pentane: 0.25
Normal hexane: 0.05

The resultant mixture is fed to evaporator E$_{21}$ wherein it vaporizes by taking 172 KW of thermal power from an external fluid which is cooled from 45° to 25° C., the temperature of the expanded mixture at the input of evaporator E$_{21}$ being 15° C.

The mixture is then conveyed to exchanger E$_{30}$ wherefrom it is discharged at a temperature of 41° C. and it is subsequently admixed with the ammonia solution from drum B$_{21}$. The ammonia vapor is partially absorbed in absorber A$_{20}$ and, at the output of absorber A$_{20}$, there are obtained an aqueous ammonia solution which has a 30% molar ammonia content, a hydrocarbon phase which is taken again by pump P$_{30}$ and a vapor phase which is discharged through line 29. This vapor phase is compressed in booster K$_1$ supplied with a 3 KW mechanical power, whereby the vapor phase is compressed from a pressure of 0.58 MPa prevailing in drum B$_{20}$ to a pressure close to 0.71 MPa, prevailing in drum B$_{21}$.

The process according to the invention has been described with reference to an arrangement comprising two absorption steps, but the same principle may be applied to an arrangement involving a greater number of absorption steps.

As concerns the type of apparatuses and equipments used for performing the process, reference can be made to the U.S. Pat. No. 4,413,479.

The evaporation temperature of the mixture of fluids (F) and (H) in the evaporator may range, for example, from −20° to +100° C.

The temperature at the end of the absorption steps (a) and (b) may range, for example, from +20° to +120° C.

The heating temperature of the generator in the desorption zone may range, for example, from 130° to 250° C.

The maximum operating pressure of the device is generally lower than 50 bars.

What is claimed as the invention is:

1. A process for producing cold and/or heat, comprising the following steps:

(a) contacting, in a first absorption step, a vapor phase (V$_1$) comprising a working fluid (F) and an auxiliary fluid (H) with a solution (S) of fluid (F) in a solvent (S) discharged from step (c), under operating conditions providing for absorption of fluid (F) and at most partial condensation of fluid (H), transferring heat to an external fluid so as to obtain a solution (S$_2$) of (F) in (S) of increased fluid (F) content and a vapor phase (V$_2$) comprising unabsorbed fluid (F) and uncondensed fluid (H), and separating said solution (S$_2$) from said vapor phase (V$_2$), said fluid (H) being at least partly immiscible with solvent (S) and with the solutions of fluid (F) in solvent (S);

(b) contacting, in a second absorption step, the vapor phase (V$_2$) issued from step (a) with a relatively lean solution (S$_3$) of fluid (F) in solvent (S) to absorb fluid (F) and condense fluid (H) contained in the vapor phase, transmitting the absorption heat and the condensation heat to an external fluid and recovering a mixture of liquid phase (L$_1$) of fluid (H) with a solution (S$_1$) of fluid (F) in solvent (S);

(c) separating the solution (S$_1$) of fluid (F) in solvent (S) from the liquid phase (L$_1$) of fluid (H) issued from step (b) and feeding said solution (S$_1$) of fluid (F) in solvent (S) to step (a);

(d) supplying at least a fraction of solution (S$_2$) of fluid (F) in solvent (S) issued from step (a) to a desorption step, subjecting said solution to desorption conditions and supplying the desorption heat from an external fluid, so as to obtain a vapor phase (V$_3$) of high fluid (F) content and a solution (S$_3$) of low fluid (F) content, separating the vapor phase (V$_3$) from solution (S$_3$) abd recycling said solution (S$_3$) to the second absorption step (b);

(e) condensing at least a portion of the vapor phase (V$_3$) of high fluid (F) content, issued from desorption step (d), while supplying heat to an external fluid to form a condensation liquid phase (L$_2$);

(f) admixing at least a portion of the condensation liquid phase (L$_2$) obtained in step (e) with at least a portion of the liquid phase (L$_1$) of liquid (H) issued from step (c) and vaporizing at least a portion of the resultant mixture by taking heat from an external fluid, the operating conditions being so selected as to provide for the vaporization of at least a portion of fluid (F) and at least a portion of fluid (H), thus obtaining a vapor phase (V$_1$), and (g) recycling the resultant vapor phase (V$_1$) to step (a).

2. A process according to claim 1, wherein the fluid (H) consists of a mixture of two or more substances not forming an azeotrope or used in non-azeotropic proportions.

3. A process according to claim 1, wherein fluid (F) is ammonia, solvent (S) is water and fluid (H) is a hydrocarbon or a halogenated hydrocarbon.

4. A process according to claim 1, wherein the operating conditions of step (a) are so selected as to effect a partial condensation of fluid (H) and obtain a liquid phase (L$_3$) of fluid (H) in addition to the solution (S$_2$) and the vapor phase (V$_2$); the liquid phase (L$_3$) is separated from the solution (S$_2$) and from the vapor phase (V$_2$), the liquid phase (L$_3$) is fed to step (f) and vaporized in admixture with the liquid phase (L$_2$) and the liquid phase (L$_1$).

5. A process according to claim 1, wherein the composition of fluid (H) circulating during step (f) is adjusted by varying the relative levels of the liquid phases (L$_2$) and (L$_3$) at the output of steps (a) and (b).

6. A process according to claim 1, wherein the composition of fluid (H) is adjusted by varying the level of the liquid phase ($L_3$) at the output of step (a), the flow rate of liquid phase ($L_3$) at the output of step (a) being null.

7. A process according to claim 1 wherein step (b) is operated at a higher pressure than step (a), the vapor phase ($V_2$) issued from step (a) being supplied to step (b) through compression means.

8. A process according to claim 1, wherein solution ($S_2$) obtained in step (a) is divided into two fractions, a first fraction being fed to desorption step (d), the remaining fraction being admixed with the vapor phase ($V_3$) obtained in step (d), the resultant liquid-vapor mixture being cooled by transferring heat to an external fluid so as to obtain the condensation liquid phase.

* * * * *